Oct. 15, 1968   R. E. VAGO   3,406,280
COORDINATE DESTINATION COMPUTER
Filed June 4, 1965   6 Sheets-Sheet 1

Fig-1

INVENTOR
Robert E. Vago
BY
James A. Hamby
PATENT AGENT

United States Patent Office 3,406,280
Patented Oct. 15, 1968

3,406,280
COORDINATE DESTINATION COMPUTER
Robert E. Vago, Bell's Corners, Ontario, Canada, assignor to Computing Devices of Canada Limited, Ontario, Canada
Filed June 4, 1965, Ser. No. 461,414
8 Claims. (Cl. 235—150.27)

This invention relates to navigational computers for use in aircraft. In particular it relates to a computer which calculates and displays information regarding the position of the aircraft with respect to any selected one of a group of flight path segments.

Navigational computers which calculate and display the position of an aircraft from a given base are known. Navigational computers which are capable of being switched from calculating and displaying the position of an aircraft with respect to one base to calculating and displaying the position of the aircraft from an alternate base are also known. One such known computer when switched from one reference base to another accomplishes the change by simulating a change in aircraft position. Another known computer performs a fresh calculation using the aircraft's computed position as a starting point.

A relatively simple computer which calculates and displays an aircraft position with respect to a chosen track between two predetermined points is also known. This computer, which will be termed, for the purpose of the following description, the basic computer, generally displays positional information as "Along Track Miles" and "Across Track Miles." Thus, the computer display is based on a desired track between a first point and a second or destination point. This desired track may represent one leg of a flight plan consisting of several legs. The basic computer displays the positional information as the distance from the second or destination point measured along the track and the distance the aircraft is from the track measured at right angles to the track. The computer may also display the range to the second or destination point and the course to steer for the destination. The information supplied to the computer is aircraft track and groundspeed information which may be obtained from Doppler radar equipment.

The basic computer can be used to guide an aircraft along a sequence of flight path legs or segments if, when the aircraft reaches the destination point at the end of one leg or segment, the information as to the track angle and length of the next leg or segment (distance to the second point of that leg) is supplied to the computer. In fact, provision is made in the basic computer to receive information about two legs or segments of a flight path so that when the aircraft completes the first leg it may be switched immediately to the second leg. In order to switch the computer from one leg to the next, the aircraft must be exactly at the common point, i.e. the aircraft must be at the point representing the end of the first leg and the beginning of the next leg. If the aircraft is not over the common point the computer cannot be switched. Therefore if for any reason the aircraft is unable to reach the changeover point the computer is of little assistance to navigation until new data calculated from the aircraft position can be set into the computer. Such circumstances can arise when adverse weather conditions make it undesirable for aircraft to fly in the vicinity of the destination point of one leg or segment.

The computer of this invention provides a compact and economical modification of the basic computer which overcomes this disadvantage. This modified computer can be switched at any time in flight from calculating and displaying information as to the aircraft position with respect to one segment of the flight path to calculating and displaying similar information with respect to another segment of the flight path.

It is therefore an object of this invention to provide a navigational computer for calculating and displaying information as to the position of an aircraft with respect to any selected one of a group of flight path segments.

It is a further object of this invention to provide a navigational computer where the displayed information can be corrected to conform to information received from Tacan equipment.

These and other objects of the invention will become apparent from the following description taken in conjunction with the accompanying drawings in which:

In order that the invention shall be described clearly, the known basic computer for providing a display of information of aircraft position with respect to a desired flight path segment will first be described.

Figure 1:
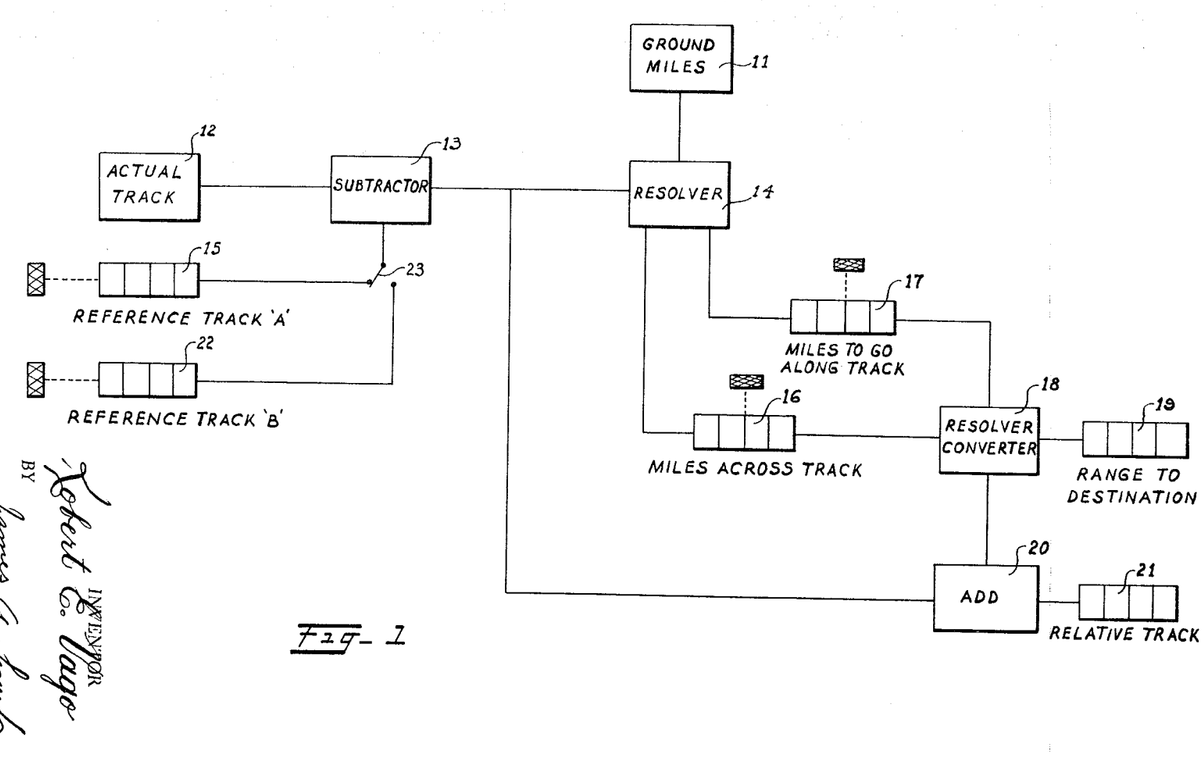
FIG. 1 is a block diagram of the basic computer.

A simplified block diagram of this basic computer is shown in FIG. 1. Reference number 12 denotes a source of signals representing the actual track of the aircraft over the ground. This source would normally be microwave equipment using the Doppler effect to solve the drift angle of the aircraft to which is added information as to the aircraft heading from the compass to form the signals representing actual track. Reference number 11 includes a related source of signals representing speed over the ground in the direction the aircraft is travelling also obtained from microwave equipment using the Doppler effect. This signal is integrated to give a signal representing the ground distance travelled by the aircraft.

The computer includes two registers 15 and 22 each of which can be manually preset to store the track angle of a segment of a desired aircraft flight path. A switch 23 connects one of the registers 15 or 22 to one input of a subtracting device 13. The other input of subtracting device 13 is connected to the source of signals 12 representing the actual track of the aircraft.

A resolver 14 is provided which is of the conventional type for performing conversion from polar to rectangular coordinates. One input of resolver 14 is connected to the output of subtracting device 13, the other input of resolver 14 is connected to the source of signals 11 representing the ground distance travelled by the aircraft.

Two outputs from resolver 14 are fed to registers 16 and 17, which are capable of being manually preset to appropriate values. This normally is the complete structure of the basic computer however further features may be provided by connecting these registers in turn to two inputs of a resolver-converter 18. Resolver-converter 18 is a conventional arrangement of a resolver together with a feed back loop to perform conversion from rectangular to polar coordinates.

One utput of resolver-converter 18 is connected to a register 19. The other output of resolver-converter 18 is connected to one input of an adding device 20. Another input of adding device 20 is connected to the output of subtracting device 13. The output of adding device 20 is connected to another register 21.

The operation of the basic computer will be described with regard to FIG. 2 which shows a desired aircraft flight path ABC. The angle between segment AB and the compass reference is reference track A, the angle between segment BC and the compass reference is reference track B. Reference tracks A and B are present in registers 15 and 22, respectively.

Prior to take off from A distance AB is set into register 17 (Miles To Go Along Track). Register 16 (Miles Across Track) is set to zero. Switch 23 is set to connect register 15 to subtracting device 13. During flight the distance of the aircraft across track is continuously computed and displayed on register 16. Also the distance remaining along track is computed and displayed on register 17. Register 19 displays the direct distance from the aircraft's position to destination B while register 21 displays the angle between the actual track of the aircraft and the line joining its present position to destination B.

Figure 2:
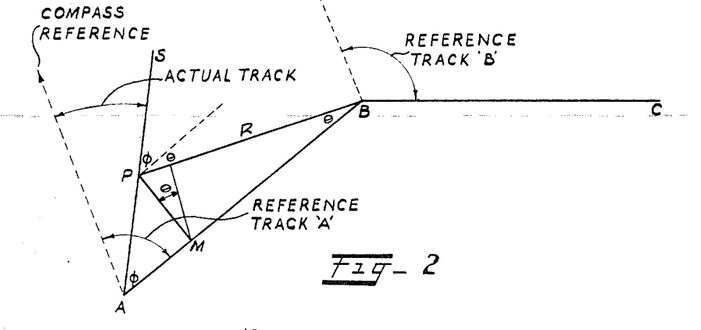
FIG. 2 is a diagram of the naviational problem solved by the basic computer,
FIGS. 3A and 3B taken together comprise a functional diagram of the modified computer of this invention.

Continuing to refer to FIG. 2, consider the aircraft tracing out an actual track AP instead of the desired track AB. When the aircraft is at point P the output of subtracting device 13 is in the angular difference between the actual track AP and the desired track AB. This difference corresponding to the angle PAM, denoted $\phi$, is fed to resolver 14. The other input to resolver 14 corresponds to AP, the ground miles travelled. The two outputs from resolver 14 correspond to AP sin $\phi$, and AP cos $\phi$, that is PM and AM respectively where PM is the perpendicular from P to track AB.

The output corresponding to PM is fed to register 16 to give the required display of miles across track. The output corresponding to AM is fed to register 17, which it will be remembered was set to distance AB before take off. Register 17 is arranged so that an increasing output from resolver 14 decreases the count in the register. Thus, with an output from resolver 14 corresponding to the distance AM register 17 displays the distance MB which is the required display of miles to go along track to destination.

The two inputs to resolver-converter 18 from registers 16 and 17 are thus quantities corresponding to PM and MB. By means of a rectangular to polar conversion the two outputs from resolver-converter 18 correspond to distance PB and to angle PBM denoted $\theta$. PB is the aircraft's range to destination and is displayed on register 19.

The output corresponding to $\theta$ is fed to adding device 20 to which is also fed the output of subtracting device 13 corresponding to $\phi$. Adding device 20 has as its output the algebraic sum of $\theta$ and $\phi$ which is fed to register 21 for display. As can be seen in FIG. 2 the algebraic sum of $\theta$ and $\phi$ gives the angle between the actual track of the aircraft and the track necessary to reach destination B. This angle will be termed the relative track. If the aircraft is flown so that the relative track register 21 displays zero then the aircraft will be tracking along PB.

When the aircraft reaches a position over destination B the registers 16, 17 and 19 will all be displaying zero. That is miles across track, miles to go along track and range to destination are all zero. If now the aircraft is to fly along BC, as a second segment of the flight path, switch 23 is actuated to connect register 22 to subtracting device 13 and distance BC manually set in register 17 (Miles To Go Along Track). The computer is now set to the necessary initial conditions to display the aircraft's position with respect to track BC.

In the basic computer of FIG. 1, the change from computation with respect to track AB to computation with respect to track BC can take place only when the aircraft is over point B. This is because only at point B are the correct values known for setting into register 16 (Miles Across Track) and register 17 (Miles To Go Along Track). If switch 23 is actuated when the aircraft's in any position other than over point B then the computer registers will not display meaningful values.

It is desirable to be able to change reference tracks at any time during flight. For example the aircraft may be flying to destination B on a desired track AB when notified that weather conditions make it impossible to land at B. The aircraft then alters course to proceed to C as an alternative destination and it is necessary that the computer calculate and display information with respect to track BC.

Figure 3A:
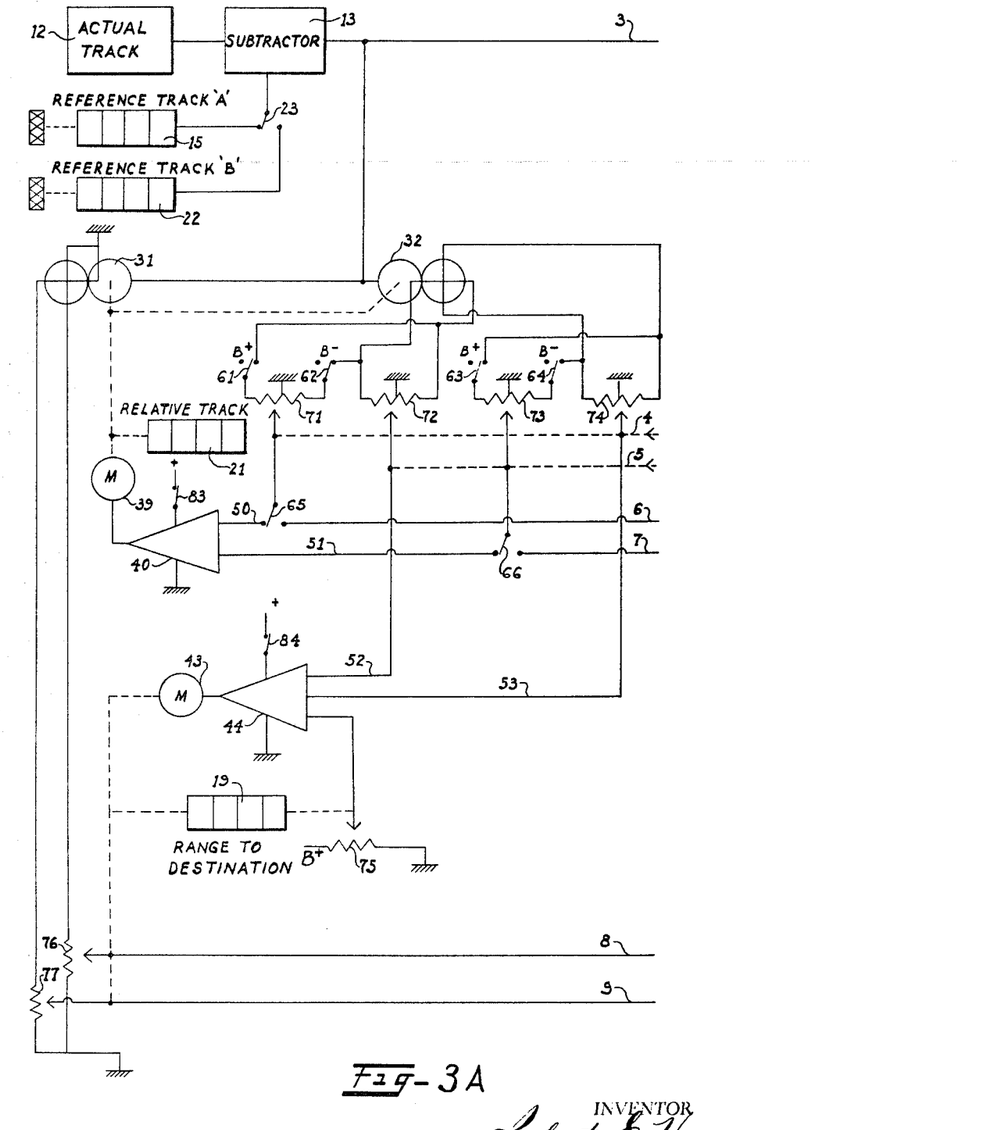
Figure 3B:
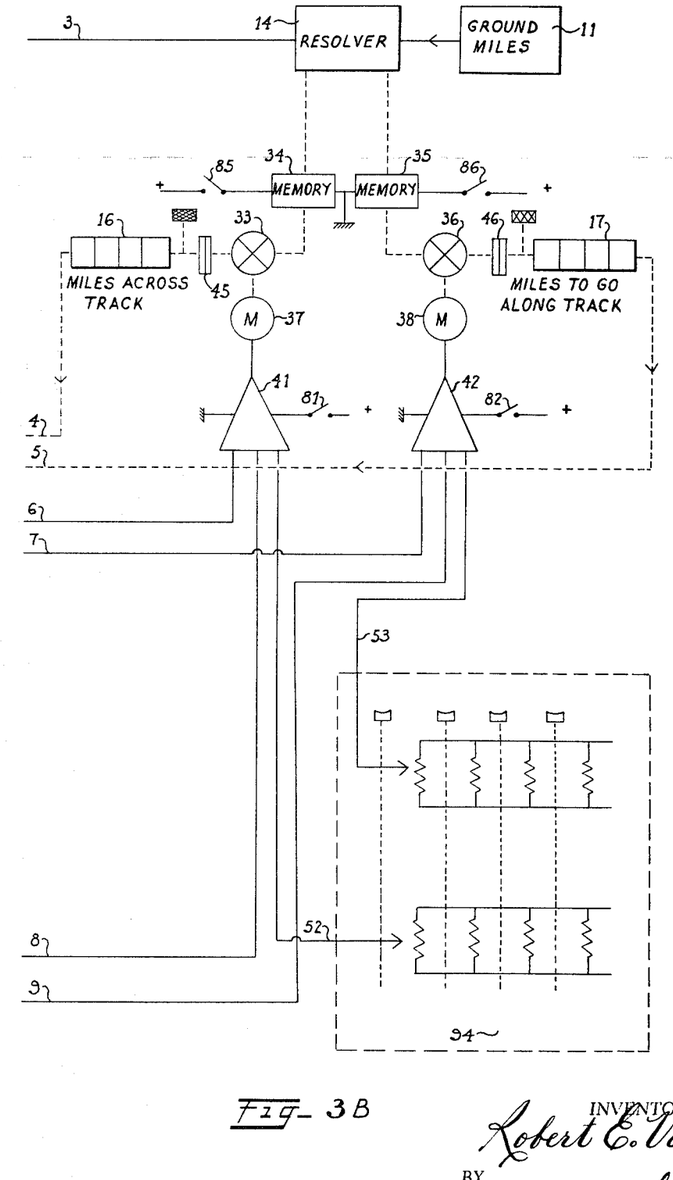

A functional diagram of the computer of this invention, which is adapted to have the reference track changed at any time, is shown in FIGS. 3A and 3B. These figures are to be taken in conjunction with FIG. 3A to the left. The computer shown in FIGS. 3A and 3B is a modification of the basic computer shown in FIG. 1 and corresponding elements occur in both figures. These corresponding elements in FIGS. 1 and 3 bear the same reference numeral.

Referring now to FIGS. 3A and 3B, a subtracting device 13 has two inputs, one connected to an information source 12, which supplies a signal representing the actual track of the aircraft over the ground, and the other connected to a switch 23 which in turn is connected to the output of register 15 or 22.

A resolver 14 has two inputs, one connected by means of conductor 3 to the output of subtracting device 13 and the other connected to an information source 11 which supplies a signal representing the distance travelled by the aircraft over the ground. While the computer of this invention is not restricted to the use of any particular type of resolver, a mechanical ball resolver has been found useful. In this resolver, a sphere is rotated about an axis at a rotational speed representing one input value. The angle of the axis of rotation is variable in one plane to represent the angle which is to be resolved into its sine and cosine functions. The pick-off rollers driven by the surface of the sphere are arranged on shafts at right angles to one another lying in the same plane as the axis of rotation of the sphere. The rotational speeds of the pick-off rollers represent the required resolved functions.

When using the ball resolver the input from information source 11 must be a mechanical rotation whose angular velocity represents the ground speed of the aircraft. The angular position of the output shafts thus represents distance. Similarly, the input from subtracting device 13 must be a mechanical displacement, which may be obtained by means of any conventional synchro system. The incremental nature of the operation of the ball resolver has the result that when the aircraft flies from A to P in FIG. 2 the resolver output at P are AP sin $\phi$ and AP cos $\phi$ regardless of the path followed which may have covered a ground distance greater than AP.

Referring to FIG. 3B, the two output shafts of resolver 14 are connected to mechanical memories 34 and 35. These memories are of known construction and may consist of a torsional spring connecting the memory input shaft to the memory output shaft. When the memory is electrically energized the output shaft is locked in position, thus ceasing to rotate. The input shift is free to continue rotating. When the memory ceases to be energized the output shaft is free to rotate once more and under the action of the torsional spring rotates to return to its corresponding position with respect to the input shaft. Memories 34 and 35 are energized through paths controlled by sequence switches 85 and 86 whose function will be discussed more fully below.

The output shaft of memory 34 is connected to one input shaft of a mechanical differential 33. The output shaft of differential 33 is connected to register 16 (Miles Across Track) through a slip clutch 45. In similar fashion the output shaft of memory 35 is connected to an input shaft of a differential 36. The output shaft of differential 36 is connected to register 17 (Miles To Go Along Track) through a slip clutch 46. Registers 16 and 17 are provided with manual control knobs.

The portion of the computer used to convert the distances in registers 16 and 17 to relative track and range-to-destination information for display in registers 21 and 19 will now be described. This comprises a differential resolver 32 with its electrical input connected to a subtracting device 13. One of the two output windings of the differential resolver is connected to both potentiometers 71 and 72 in parallel, the other output winding is connected to both potentiometers 73 and 74 in parallel. All the potentiometers 71–74 have a grounded centertop. A pair of sequence switches 61 and 62 occur in the connection between potentiometer 71 and the output winding of transolver 32. When actuated these switches disconnect potentiometer 71 from resolver 32 and connect the potentiometer to sources of reference voltages B+ and B−. In a similar fashion sequence switches 63 and 64 are located between potentiometer 73 and the other output winding of transolver 32 to disconnect potentiometer 73 from resolver 32 and connect the potentiometer to sources of reference voltages B+ and B−.

The slider of potentiometer 71 is connected through a sequence switch 65 and a conductor 50 to one input of a summing amplifier 40. The slider of potentiometer 73 is connected through a sequence switch 66 and a conductor 51 to another input of the summing amplifier 40. The power supply to amplifier 40 is connected through a normally closed sequence switch 83.

Summing amplifier 40 controls a motor 39 whose shaft is mechanically connected to register 21 (Relative Track). Motor 39 is also mechanically connected to the variable position winding of resolver 32.

The slides of potentiometers 72 and 74 are each connected to separate inputs of another summing amplifier 44 via conductors 52 and 53 respectively. A third input of summing amplifier 44 is connected to the slider of a potentiometer 75 which is connected between reference voltage B+ and ground. The power supply to amplifier 44 is connected through a normally closed sequence switch 84.

Amplifier 44 controls a motor 43 whose shaft is mechanically connected to register 19 (Range To Destination). Motor 43 is also mechanically connected to the slider of potentiometer 75.

The connection between this portion of the computer and the previously described portion is provided by a mechanical coupling 4 between the shaft of register 16 and the sliders of potentiometers 71 and 74. A further connection is provided by a coupling 5 between registers 17 and the sliders of potentiometers 72 and 73.

The additional components necessary to make provision for a change of reference track at any time will now be described. These comprise a further differential resolver 31 with its electrical input connected to subtracting device 13. The variable position winding of resolver 31 is mechanically coupled to the shaft of motor 39. The two output windings of resolver 31 are connected one to a potentiometer 76 and the other to a potentiometer 77. The potentiometers and output windings each have one side grounded. The sliders of potentiometers 76 and 77 are mechanically coupled to the shaft of motor 43.

A summing amplifier 41 having three inputs has one input connected to the slider of potentiometer 76 by a conductor 8. A second input of amplifier 41 may be connected by sequence switch 65 to the slider of potentiometer 71 through a conductor 6.

The third input is connected to one output of a station selector 94 through a conductor 52. The power supply to amplifier 41 is connected through a normally open sequence switch 81. Amplifier 41 controls a motor 37 whose shaft is coupled to the second input of the mechanical differential 33.

A summing amplifier 42, having three inputs, has one input connected to the slider of potentiometer 77 through a conductor 9. A second input of amplifier 42 may be connected (by sequence switch 66) to the slider of potentiometer 73 through conductor 7. The third input is connected to the other output of station selector 94 via a conductor 53. The power supply to amplifier 42 is connected through a normally open sequence switch 82. Amplifier 42 controls a motor 38 whose shaft is coupled to the second input of the mechanical differential 36.

Figure 4:
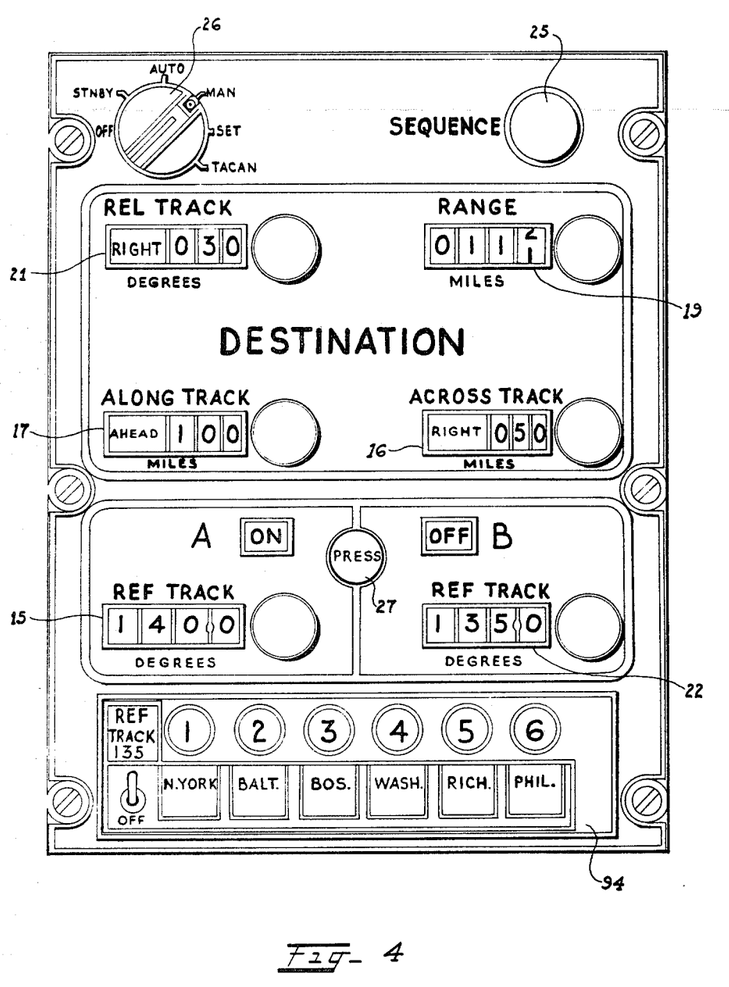
FIG. 4 is a front view of the display panel of the modified computer of this invention.

FIG. 4 is a front elevation of the display panel associated with the modified computer of FIG. 3. Registers 15, 16, 17, 19, 21 and 22 are shown together with their associated control knobs for setting the registers to required values. Push button switch 27 controls the function of switch 23 shown in FIGURE 3. The station selector 94, which will be described below, is positioned at the foot of the display panel.

A mode switch 26 is provided to control the operation of the computer. The MANUAL position is the normal position for in-flight computation with the computer operating in the same manner as the basic computer previously described. The AUTO position has the same effect as the MANUAL position with the additional feature that the shaft of register 21 (Relative Track) is connected to a synchro transmitter (not shown) which is in turn connected to the automatic pilot. The SET position of mode switch 26 energises mechanical memories 34 and 35. This feature is used for in-flight alteration of register 17. The TACAN position is used to correct the computed values of position by means of information from Tacan equipment.

The sequence lamp 25 is illuminated when switching from reference track A to reference track B while computation is in progress. This indicates that the displayed values in the registers may not be meaningful while the registers are being driven to a value indicating the position with respect to the new reference track.

The operation of the computer of FIG. 3 will now be described. During normal in-flight computation the sequence switches are in the positions shown in FIG. 3. That is potentiometers 71 and 73 are connected to the output windings of resolver 32 and the potentiometer sliders are connected to amplifier 40. Amplifiers 40 and 44 are energized, amplifiers 41 and 42 are not energized. The memory devices 34 and 35 are not energized, that is the input shaft is directly coupled to the output shaft.

Referring once again to FIG. 2 consider an aircraft at position P, having taken off from A with track AB set in the computer as reference track A. Prior to take off register 16 had been set to zero miles and register 17 had been set to distance AB. At point P the two outputs of resolver 14 correspond to distances PM and AM. Register 17 is arranged to count back in response to the output from resolver 14 and hence the displacement of the sliders of potentiometers 72 and 73 corresponds to distance MB. The displacement of the sliders of potentiometers 71 and 74 corresponds to distance PM.

The feedback loop formed by amplifier 40, motor 39, resolver 32 and potentiometers 71 and 73 calculates the correct value of $(\theta+\phi)$ by solving the equation:

$$PM \cos \theta - MB \sin \theta = 0$$

which may be rearranged to:

$$\tan \theta = PM/MB$$

The two inputs to amplifier 40 correspond to $PM \cos \theta$ and to $-MB \sin \theta$. The output voltage of the amplifier becomes zero when the shaft position of motor 39 corresponds to $(\theta+\phi)$. Then resolver 32 has a mechanical input corresponding to $(\theta+\phi)$ and an electrical input corresponding to $\phi$. Hence the two output windings give signals proportional to $\sin \theta$ and $\cos \theta$. Since the shaft of motor 39 is also connected to register 21 the correct value of relative track $(\theta+\phi)$ is displayed.

The feedback loop formed by amplifier 44, motor 43 and potentiometer 75 calculates the distance PB by solving the equation:

$$R = PM \sin \theta + MB \cos \theta$$

The two inputs to amplifier 44 from potentiometers 72 and 74 correspond to $-MB \cos \theta$ and $-PM \sin \theta$ respectively. The third input from potentiometer 75 corresponds to R. The output voltage of the amplifier becomes zero when the shaft position of motor 43 corresponds to R. Since the motor shaft is also connected to register 19 the correct value of range to destination is displayed.

Figure 5:
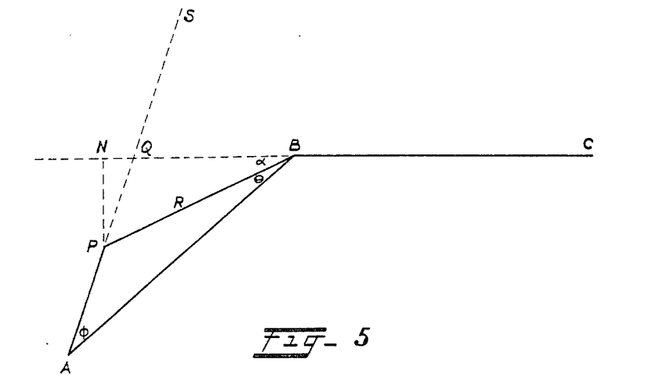
FIG. 5 is a diagram of the navigational problem solved by the computer of FIG. 3.

The operation of an in-flight change of reference track will now be described referring additionally to FIGS. 4 and 5. As before the aircraft will be considered to have reached point P, the computer has been operating with respect to reference track AB and is switched to operate with respect to reference track BC (FIGS. 2 and 5).

When the reference track switch 27 on the display panel (FIG. 4) is actuated, switch 23 (FIG. 3) is changed to connect register 22, containing information as to reference track B to subtracting device 13. At the same time the sequence switches in FIG. 3 are actuated to the opposite position from that shown and the sequence lamp on the display panel is illuminated.

More specifically, switches 61–64 are actuated to connect potentiometers 71 and 73 to reference voltages B+ and B−. Switches 65 and 66 are actuated to connect the sliders of potentiometers 71 and 73 to the inputs of amplifier 41 and 42 respectively. Switches 83 and 84 are opened to interrupt the power supply of amplifiers 40 and 44. Switches 81, 82, 85 and 86 are closed to energize amplifiers 41, 42 and memory units 34, 35.

Since the amplifiers 40 and 44 are switched off the motors 39 and 43 remain stationary and their shaft positions continue to represent $(\theta+\phi)$ and PB respectively. Since one of the inputs to subtracting device 13 has changed from reference track A to reference track B the output of the subtracting device changes to a value corresponding to angle SQB in FIG. 5. It follows from elementry geometry that:

$$\text{angle } SQB = \theta + \phi + \alpha$$

where $\alpha$ denotes angle PBN.

Thus the electrical input to differential resolver 31 corresponds to $(\theta+\phi+\alpha)$ and the mechanical input, from motor 39, corresponds to $(\theta+\phi)$. The output windings give signals corresponding to the sine and cosine of the difference of the inputs that is, $\sin \alpha$ and $\cos \alpha$. These signals are fed to potentiometers 76 and 77 whose sliders have been displaced by an amount correponding to PB by motor 43. Thus the output signals from the sliders of potentiometers 76 and 77 correspond to PB $\sin \alpha$ and PB $\cos \alpha$.

From FIG. 5 it will be seen that PB $\sin \alpha$ and PB $\cos \alpha$ are the desired values for miles across track and miles to go along track for an aircraft at position P, with respect to track NB and destination B.

The feedback loop formed by amplifier 41, motor 37, mechanical differential 33 and potentiometer 71 acts to set the quantity PB $\sin \alpha$ in register 16. One input of amplifier 41 is connected to the slider of potentiometer 76. The second input is connected, via sequence switch 65, to the slider of potentiometer 71. The two outputs from the station selector 94 on conductors 52 and 53 are at ground potential until one of the push button switches in the station selector is actuated. During an in-flight change of reference track the third input of each of amplifiers 41 and 42 is thus grounded and plays no part in the computation. Potentiometer 71 is connected to reference voltages B+ and B− by sequence switches 61 and 62. When the inputs to amplifier 41 balance one another register 16 displays the desired quantity, PB $\sin \alpha$.

The feedback loop formed by amplifier 42, motor 38, differential 36 and potentiometer 73 acts to set the quantity PB $\cos \alpha$ in register 17. One input of amplifier 42 is connected to the slider of potentiometer 77. The second input is connected, via sequence switch 66, to the slider of potentiometer 73. The third input on conductor 53 is grounded as previously described. Potentiometer 73 is connected to reference voltages B+ and B− by sequence switches 63 and 64. When balance is achieved in the feedback loop register 17 displays the desired quantity PB $\cos \alpha$.

When the new values have been set in registers 16 and 17 the output voltages of amplifiers 41 and 42 return to and remain at zero. When this condition is sensed the sequence switches are returned to their original condition and the sequence lamp on the display panel. FIG. 4 is extinguished. If the aircraft has travelled a significant distance during the computation of the new values then the components of distance travelled along and across track NB have been stored in mechanical memories 34 and 35. On the return of the sequence switches to their original condition memories 34 and 35 cease to be energized and the stored distances are set into registers 16 and 17 adding to the newly computed values PB $\sin \alpha$ and PB $\cos \alpha$. If the aircraft does not travel a significant distance during the computation of the new values then the mechanical memories 34 and 35 may be omitted.

When the sequence switches return to their original position the computer resumes normal in-flight computation as previously described but now with respect to track NB and destination B. At any convenient time register 17 (Miles To Go Along Track) may be reset manually to add the distance BC to the distance displayed in the register. This in turn alters the input signal to the feedback loops controlling registers 19 (Range To Destination) and 21 (Relative Track) so that they calculate and display information with respect to the same track NBC but with C instead of B as the destination.

If the aircraft is to travel a significant distance while the manual adjustment to register 17 is being made then the mode switch on the display panel FIG. 4 can be changed to the SET position before making the register adjustment. This has the effect of energizing memories 34 and 35 to store the distances flown along and across track during the register adjustment. When the adjustment is completed the mode switch on the display panel is switched back to the MAN or AUTO position.

Figure 6:
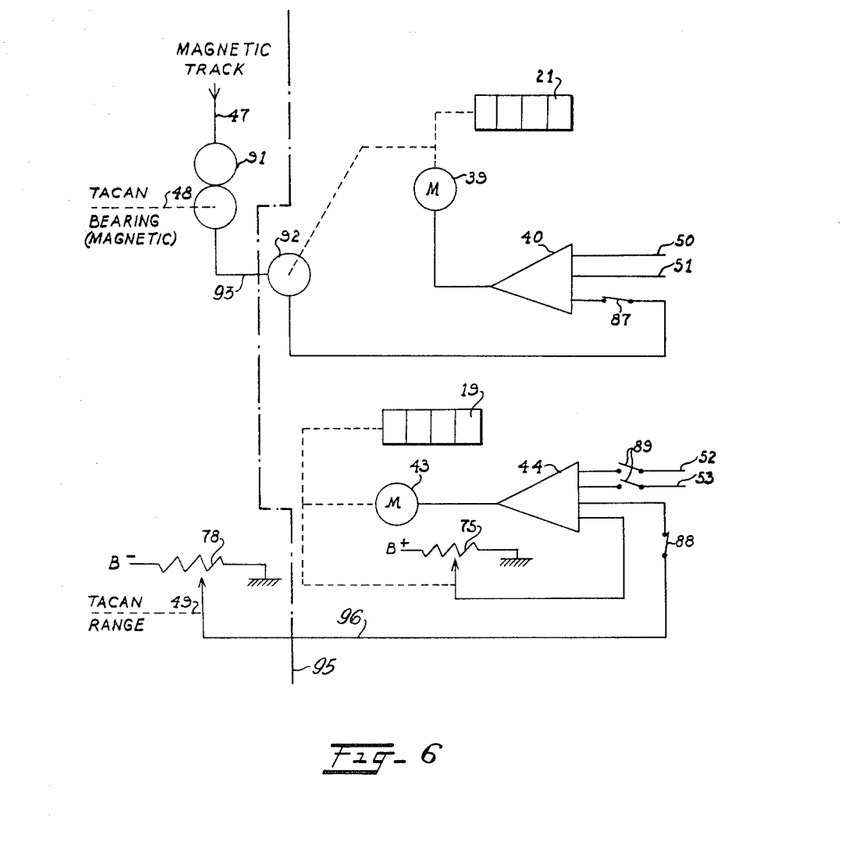
FIG. 6 is a functional diagram of a modification of the computer of FIG. 3 adapted to use information from Tacan equipment.

A modification of the computer makes it possible to use the information obtained from interrogation of a TACAN responder at the destination to reset the displayed information to the known ground position. FIG. 6 shows the additional components necessary for this modification together with amplifiers 40 and 44 which have their associated circuits altered. The remainder of the computer is as shown in FIG. 3.

Referring to FIGURE 6 a portion of conventional TACAN equipment is shown to the left of chain dotted line 95. A differential synchro 91 has its input windings electrically connected by a conductor 47 to a signal representing the magnetic track of the aircraft. The mechanical input 48 to the differential synchro represents the magnetic bearing of the destination. A control transformer 92 has its stator electrically connected to differential synchro 91 by conductor 93. The rotor of control transformer 92 is mechanically coupled to motor 39 and electrically connected to amplifier 40 which is modified to accept a third input through a sequence switch 87.

A potentiometer 78 is connected between a source of reference voltage B− and ground. The slider of potentiometer 78 is mechanically driven by shaft 49 so that its displacement corresponds to the range of the Tacan responder. The slider is electrically connected to amplifier 44 which is modified to provide a fourth input through conductor 96 and a sequence switch 88. Amplifier 44 is also modified by the provision of a sequence switch 89 adapted to disconnect the two inputs normally connected to potentiometers 72 and 74 by conductors 52 and 53.

When the mode switch on the display panel is set to the Tacan position the following sequence switches are actuated: switches 61–64 to connect potentiometers 71 and 73 to sources of reference voltage B+ and B−; switches 65 and 66 to connect the sliders of the same potentiometers to amplifiers 41 and 42 respectively: switches 81, 82, 85 and 86 to energize amplifiers 41, 42 and mechanical memories 34, 35. In addition, sequence switches 87–89 (FIG. 6) are actuated to connect the rotor of control transformer 92 to amplifier 40, to connect the slider of potentiometer 78 to amplifier 44 and to disconnect conductors 52 and 53 from amplifier 44.

The operation of the computer on the Tacan setting will now be described assuming the aircraft to be at position P in FIG. 2 and assuming the Tacan equipment to be supplying the range and bearing of destination B. The two inputs to differential synchro 91 correspond to the angle of aircraft track and to the bearing of destination B. The output signal from synchro 91 corresponds to the difference of the inputs, that is the angle $(\theta+\phi)$. The feedback loop formed by amplifier 40, motor 39 and control transformer 92 acts to set this corrected value of $(\theta+\phi)$ in register 21. This is done by causing the rotor of control transformer 92 to be rotated until a null input to amplifier 40 is obtained. During Tacan operation the other two inputs of amplifier 40 are disconnected by the actuation of sequence switches 65 and 66.

The displacement of the slider of potentiometer 78 represents the true range of point B from P. The feedback loop formed by amplifier 44, motor 43 and potentiometer 75 acts to set the corrected value of range PB in register 19. This is done by balancing the input from potentiometer 75 against the input from potentiometer 78.

Thus the corrected values of PB and $(\theta+\phi)$ are set in registers 19 and 21. The computer now uses these values to produce PB sin $\theta$ and PB cos $\theta$, that is corrected values corresponding to distances PM and MB which are then set in registers 16 and 17 respectively. This is the reverse of the process used in normal in-flight computation in which the values PM and MB are first derived and then distance PB and angle $\theta$ calculated from these values.

The output windings of differential resolver 31 produce voltages corresponding to the sine and cosine of the difference of the inputs. During Tacan operation one input to resolver 31 corresponds to $\phi$, from subtracting device 13, and the other input corresponds to $(\theta+\phi)$ from motor 39. Thus the output voltages applied to potentiometers 76 and 77 correspond to sin $\theta$ and cos $\theta$. Since the sliders of potentiometers 76 and 77 are mechanically coupled to motor 43 the output voltages from the sliders correspond to PB sin $\theta$ and PB cos $\theta$, the corrected values required for registers 16 and 17.

These values are set in registers 16 and 17 in the same manner as has been described in connection with the in-flight change of reference course. That is the feedback loop formed by amplifier 41, motor 37 and potentiometer 71 sets register 16 to a value corresponding to input voltage PB sin $\theta$. Similarly the feedback loop formed by amplifier 42, motor 38 and potentiometer 73 sets register 17 to a value corresponding to input voltage PB cos $\theta$.

When the corrected values, derived from the Tacan fix, have been set in the several registers the mode switch on the display panel can be returned to the MAN or AUTO position. This has the effect of restoring the sequence switches to their previous position. In turn this releases the output shafts of memories 34 and 35 to add to registers 16 and 17 information as to any change in aircraft position occurring during the Tacan computation.

The computer is also adapted to operate with a station selector to provide alternative destinations when flying with respect to one reference track. The bottom portion of the display panel FIG. 4 contains a station selector unit 94 with six push button switches corresponding to alternative destinations. The station selector is preset to a fixed reference track and can be used only when the computer is operating with respect to that reference track.

Figure 7:
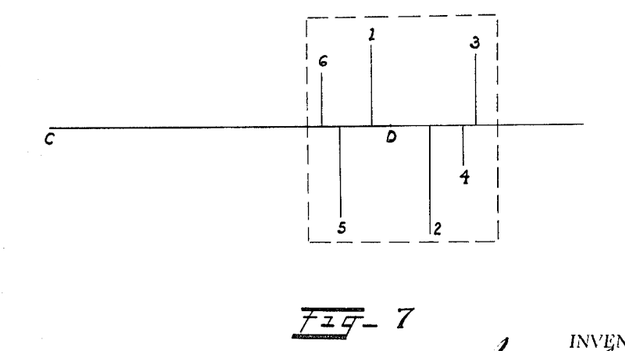
FIG. 7 is a diagram of a flight path segment with alternative destinations.

The function of the station selector is indicated in FIG. 7. If the computer is operating with respect to reference track CD and destination D then actuation of the push button switch corresponding to any one of the alternative destinations 1–6 alters the displayed information in the computer registers to the correct values for navigation to the alternative destination.

The push button operated station selector 94 is shown schematically in the bottom right hand portion of FIG. 3B. One output of the selector is connected to amplifier 41 via conductor 52 and the other to amplifier 42 via conductor 53. It will be recalled that in normal operation the two outputs from the station selector are at ground potential and hence have no affect on the various computing operations previously described. When one of the alternative destination push buttons is actuated the output voltages of selector 94 correspond to the distances, along and across track CD, from point D to the alternative destination.

The operation of the computer when one of the alternative destination switches on selector 94 is actuated is as follows. Sequence switches 61–66 and 81–86 are actuated. This results in potentiometers 71 and 73 being connected to reference voltages B+ and B− and the sliders of these potentiometers being connected to amplifiers 41 and 42 respectively. Amplifiers 40 and 44 are switched off. Amplifiers 41, 42 and memories 34, 35 are energized.

As has been previously described with regard to Tacan operation the voltages on the sliders of potentiometers 76 and 77 correspond to the distances along and across track from the aircraft's present position to its destination. The voltage corresponding to across track distance is connected to amplifier 41 and the voltage corresponding to along-track distance is connected to amplifier 42. The input to amplifier 41 which is connected to the station selector is supplied with a voltage representing the across-track distance of the alternative destination from point D. The input to amplifier 42 which is connected to the station selector is supplied with a voltage representing the along-track distance of the alternative destination from point D.

The feed back loop formed by amplifier 41, motor 37 and potentiometer 71 acts to set register 16 to a value corresponding to the sum of the two inputs, that is the across-track distance from the aircraft's present position to the alternative destination. Similarly the feed back loop formed by amplifier 42, motor 38 and potentiometer 73 acts to set register 17 to a value corresponding to the along-track distance from the aircraft's present position to its alternative destination.

When the new values have been set in registers 16 and 17 the push button switch on the station selector is released and the sequence switches return to their normal operating position. This releases the output shafts of memories 34 and 35 to add to registers 16 and 17 the distances the aircraft has travelled across and along track during the computation.

The return of the sequence switches to their normal operating position energizes amplifiers 40 and 44 once more to calculate the new range and relative track to the alternative destination from the new values in registers 16 and 17. This is done in the manner previously described for normal in-flight computation.

Thus there has been described a navigational computer capable of calculating and displaying information as to the position of an aircraft with respect to any one flight path segment selected from a group of flight path segments. The displayed information can be corrected by means of signals from Tacan equipment. A modification which enables the computer to select one destination from a group of destinations has also been described.

The embodiments of the invention in which an exclusive property or privilege is claimed are defined as follows:

1. A navigational computer for calculating position with respect to a first point and any one of a plurality of designated tracks passing therethrough, comprising
   a first settable storage means for storing the reference angle of a first one of said designated tracks,
   a second settable storage means for storing the reference angle of a second one of said designated tracks,
   means for supplying signals representing the track made good and the distance travelled from a second point lying on said first track at a known distance from said first point,
   subtracting means having a first input connected to said signal supplying means and a second input switchedly connected to one of said storage means for supplying a difference signal representing the difference between the track made good and one of said reference tracks,
   first computing means responsive to said subtracting means and to the signal representing the distance travelled from said second point to calculate position with respect to said second point and said first track,
   second computing means responsive to said first computing means to calculate position with respect to said first point and said first track,
   third computing means operable in a first circuit configuration responsive to signals representing position from said second computing means and said difference signal to calculate range and relative track to said first point,
   said third computing means being operable in a second circuit configuration responsive to said difference signal and to signals representing range and relative track stored in said third computing means to calculate position with respect to said first point and said second track,
   sequence switching means controlling said third computing means for selectively establishing said first or second circuit configuration.

2. A navigational computer as set forth in claim 1 wherein said third computing means is operable in said first circuit configuration as rectangular-to-polar coordinate conversion means to convert positional information with respect to said first point measured along and across said first track to range and relative track information with respect to said first point and is operable in said second circuit configuration as polar-to-rectangular coordinate conversion means to convert range and relative track information with respect to said first point to positional information with respect to said first point measured along and across said second track.

3. A navigational computer as set forth in claim 2 wherein said second computing means includes a first and a second settable display register for displaying positional information measured along and across one of said designated tracks and said third computing means includes a third and a fourth display register for displaying relative track and range respectively to said first point.

4. A navigational computer as set forth in claim 3 wherein said third computing means includes a first and a second positioning system mechanically coupled to said first and second display register respectively.

5. A navigational computer as set forth in claim 4 wherein said first circuit configuration of said third computing means has inputs mechanically coupled to said first and second registers and outputs mechanically coupled to said third and fourth registers and said second circuit configuration of said third computing means has inputs mechanically coupled to said third and fourth registers and outputs electrically coupled to inputs of said first and second positioning system.

6. A navigational computer as set forth in claim 5 further including
   station selector means having a first and a second output,
   said first selector output being connected to a further input of said first positioning system and said second selector ouput being connected to a further input of said second positioning system,
   selective switching means to produce predetermined voltages at said first and second selector outputs,
   said selective switching means actuating said sequence switching means to establish said third computing means temporarily in said second circuit configuration.

7. A navigational computer as set forth in claim 5 further including
   directional radio equipment for supplying signals representing the correct relative track and range of said destination point,
   a third positioning system responsive to said correct relative track signal to position said third register, and
   a fourth positioning system responsive to said correct range signal to position said fourth register,
   said third computing means being in said second circuit configuration when said third and fourth positioning systems are energized.

8. A navigational computer as set forth in claim 5 wherein
   said first computing means is a mechanical ball resolver having two outputs,
   said second computing means comprises,
   a first mechanical differential having a first input connected to one output of said resolver and its output connected to said first display register, and
   a second mechanical differential having a first input connected to the other output of said ball resolver and its output connected to said second display register,
   said third computing means comprises,
   a first and a second differential resolver each having an electrical input, a mechanical input and two output windings,
   the electrical input of each differential resolver being connected to said subtracting means to receive said difference signal,
   a first and a second potentiometer switchably connected in said first circuit configuration one to each of the output windings of said first differential resolver,
   said first and second potentiometer being switchably connected to sources of reference potential in said second circuit configuration,
   the slider of said first potentiometer being mechanically coupled to said first display register and the slider of said second potentiometer being mechanically coupled to said second display register,
   a first summing amplifier controlling a first motor mechanically coupled to the mechanical input of each differential resolver and to said third display register,
   the sliders of said first and second potentiometers being switchably connected to inputs of said first summing amplifier in said first circuit configuration thereby forming a feed back computing loop through said first summing amplifier, said first motor, said first differential resolver and said first and second potentiometers,
   a third and a fourth potentiometer connected one to each of the output windings of said first differential resolver,
   said third potentiometer being ganged to said second potentiometer and said fourth potentiometer being ganged to said first potentiometer,
   a fifth potentiometer connected between sources of reference potential,
   a second summing amplifier controlling a second motor mechanically coupled to said fourth display register and the slider of said fifth potentiometer,
   the sliders of said third, fourth and fifth potentiometers being connected to the inputs of said second summing amplifier thereby forming a feed back computing loop through said second summing amplifier, said second motor and said fifth potentiometer, a sixth and a seventh potentiometer connected one to each of the output windings of said second differential resolver, the sliders of said sixth and seventh potentiometers being mechanically coupled to said second motor, a third summing amplifier controlling a third motor mechanically coupled to a second input of said first differential, the slider of said sixth potentiometer being connected to one input of said third summing amplifier and the slider of said first potentiometer being switchably connected to another input of said third summing amplifier when said third computing means is in said second circuit configuration, said third amplifier, said third motor, said first differential, and said first potentiometer forming said first positioning system, a fourth summing amplifier controlling a fourth motor mechanically coupled to a second input of said second differential, the slider of said seventh potentiometer being connected to one input of said fourth summing amplifier and the slider of said potentiometer being switchably connected to another input of said fourth summing amplifier when said third computing means is in said second circuit configuration, said fourth amplifier, said fourth motor, said second differential and said second potentiometer forming said second positioning system, said sequence switching means energizing said first and second summing amplifiers only in said first circuit configuration and energizing said third and fourth summing amplifiers only in said second circuit configuration.

References Cited

UNITED STATES PATENTS

| | | | |
|---|---|---|---|
| 3,043,514 | 7/1962 | Smith | 235—186 |
| 3,248,734 | 4/1966 | Weiss et al. | 343—112 |
| 3,308,278 | 3/1967 | Davis et al. | 235—150.27 |
| 3,201,793 | 8/1965 | Pasquier et al. | 235—150.27 XR |

MARTIN P. HARTMAN, *Primary Examiner.*